United States Patent [19]
Wilhelmy et al.

[11] Patent Number: 5,121,650
[45] Date of Patent: Jun. 16, 1992

[54] POSITIONING SHAFT SUPPORTED ROTATABLY AND AXIALLY IN A CASING

[75] Inventors: Egon Wilhelmy, Bad Honnef; Edwin Spahl, Cologne, both of Fed. Rep. of Germany

[73] Assignee: Ford Motor Company, Dearborn, Mich.

[21] Appl. No.: 710,869

[22] Filed: Jun. 6, 1991

[30] Foreign Application Priority Data

Jun. 18, 1990 [DE] Fed. Rep. of Germany ....... 4019332

[51] Int. Cl.⁵ .................. F16H 59/08; F16H 59/04
[52] U.S. Cl. ........................................ 74/475; 74/527
[58] Field of Search ............ 74/475, 527; 403/108, 403/109, 378

[56] References Cited

U.S. PATENT DOCUMENTS

| | | | |
|---|---|---|---|
| 2,153,430 | 11/1937 | Newman | 74/527 |
| 2,612,051 | 9/1952 | Felt | 74/527 O |
| 2,871,719 | 2/1959 | Hooker | 74/527 |
| 2,917,941 | 12/1959 | Wittren | 74/475 O |
| 3,631,740 | 1/1971 | Gauagan | 74/527 O |
| 3,800,603 | 4/1974 | Hauser et al. | 74/475 X |
| 4,038,508 | 7/1977 | Mapelsden | 74/527 X |
| 4,070,914 | 1/1978 | Reinhardt et al. | 74/527 X |
| 4,275,613 | 6/1981 | Wörner et al. | 74/527 X |
| 4,635,395 | 1/1987 | Moushovitz et al. | 74/527 X |

FOREIGN PATENT DOCUMENTS 3603609 8/1987 Fed. Rep. of Germany .
3602157 12/1988 Fed. Rep. of Germany .

Primary Examiner—Rodney H. Bonck
Assistant Examiner—Daniel Wittels
Attorney, Agent, or Firm—Frank G. McKenzie; Roger L. May

[57] ABSTRACT

A device for positioning shafts supported for axial and angular movement in a bore formed in a housing includes detent recesses and spring-loaded bolt subassemblies surrounding the shaft in an enlarged portion of the bore on which the shaft is located. A concentrically arranged, radially expandable spring element has recesses on mutually facing longitudinal edges and is fixed axially in the housing. The shaft is provided with resiliently biased radial projections extending between the mutually facing edges on which the recesses are formed.

10 Claims, 3 Drawing Sheets

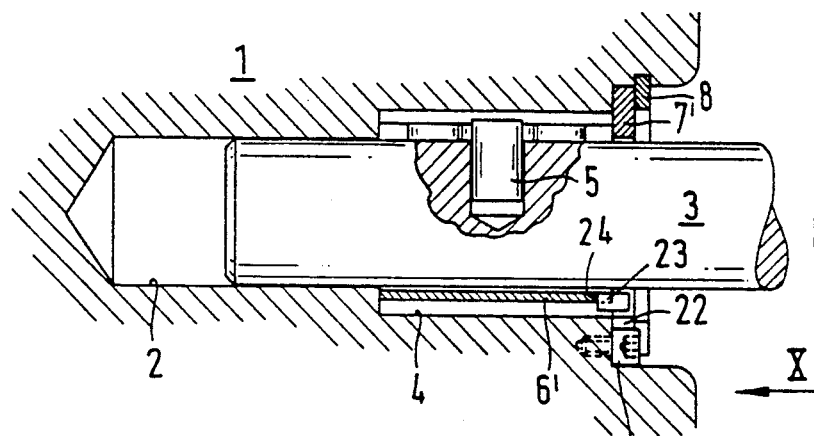
FIG. 8
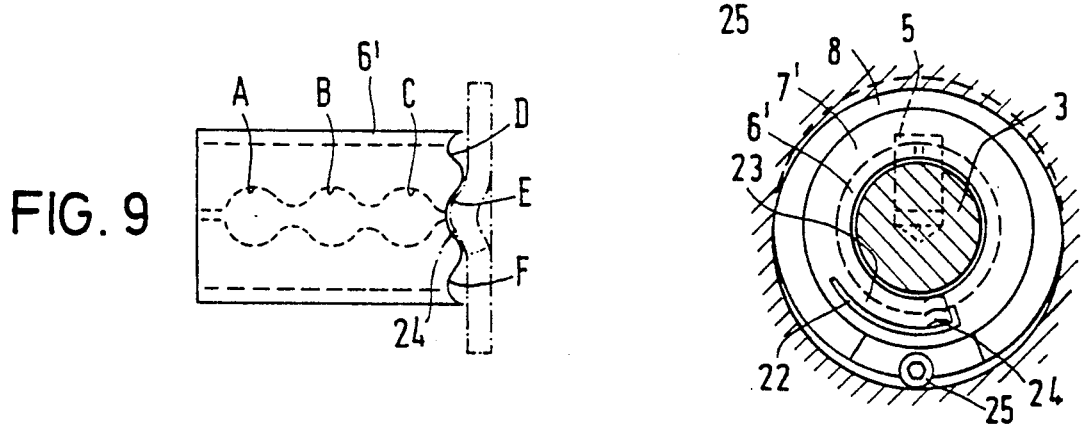
FIG. 9
FIG. 10
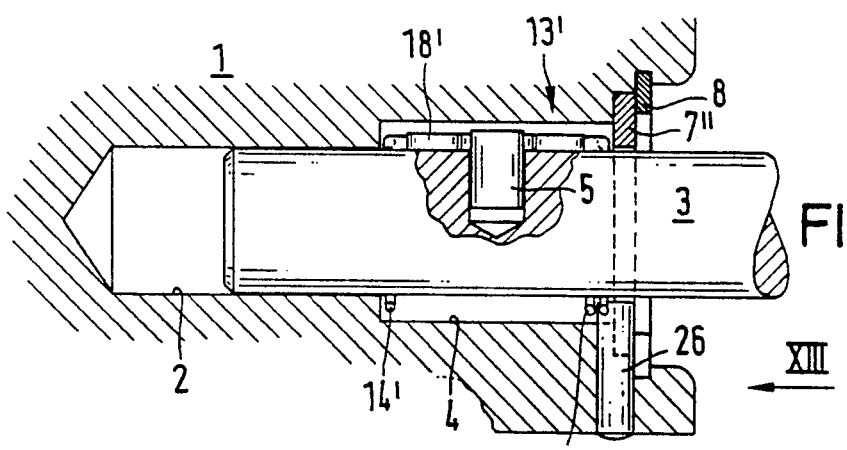
FIG. 11
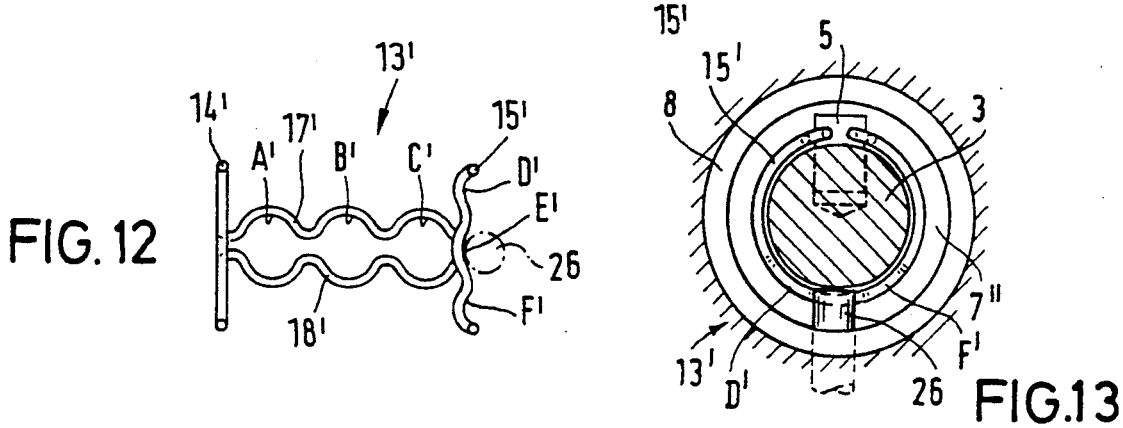
FIG. 12
FIG. 13

POSITIONING SHAFT SUPPORTED ROTATABLY AND AXIALLY IN A CASING

BACKGROUND OF THE INVENTION

1. Field of the Invention

This invention relates to the shift mechanism for a manual transmission of the type used in an automotive vehicle.

2. Description of the Prior Art

A positioning device for a gear-shift shaft in a transmission of a motor vehicle is described in German Patentschrift DE 36 02 157.

This positioning device, which holds several axial positions of the gear-shift shaft of a manual transmission, the shaft is held rotatably and axially displaceably in a bearing bore formed in the transmission housing to perform gear-shifting, selecting and engaging movements. The shaft is axially positioned by means of a depression in the shaft and by engagement of a spring-loaded ball held axially in the housing with the depression.

This positioning device has the disadvantage that the depressions are constructed directly on the shaft and that the detent ball has its axial location determined by a sleeve held against displacement on the housing. Due to accumulation of normal production tolerances, the axial location of the assembled shaft relative to the location of the sleeve leads to considerable deviation in the position established by the positioning device from the desired actual shift position of the gear-shift shaft.

German Offenlegungsschrift DE-PS 36 03 609, describes a device for positioning a gear-shift shaft of a transmission, in which depressions for locating the shaft radially are formed on a component connected to the shaft and in which catch bolts are constructed in the form of balls held in a part pressed by a spring axially onto a component connected to the shaft. That component is held in the housing against rotation.

The radial position of the gear-shift shaft is established by the position of depressions in the component connected to the shaft. Rotation of the shaft to its neutral gear-shift plane results due to the inclination of the connecting faces between the depressions as the balls move out of the depressions.

The positioning device of the '609 document has the disadvantage that additional components requiring considerable space have to be located on the shaft. Also, the angular location of the shaft, but not its axial position, is achieved by the device.

SUMMARY OF THE INVENTION

An object of this invention is to provide an improved a positioning device for gear-shift shafts in transmissions such that, with low production and assembly costs, and with minimal space requirement, the device allows axial and radial positioning of the shaft and, if necessary, angular return of the shaft to a predetermined position.

Because the gear-shift shaft is supported in an enlarged portion of its bearing bore by a concentrically arranged, radially expandable spring element, which has recesses on mutually facing edges and is fixed axially in the housing, and the shaft is provided with a radially projecting bolt extending between the mutually facing edges, axial positioning of the shaft results with low dimensional tolerance accumulation because of the minimum number of components and their mutual proximity.

A radially expandable, C-shaped cylindrical spring sleeve is used in the device and can be produced simply by stamping and subsequent bending. The spring element can be produced from a suitable plastic material, for example, by injection molding. When plastic is used, the desired spring properties and sliding properties can be optimally adapted to the choice of plastic material. Because the concentrically arranged, radially expandable spring element is formed by an approximately coil-shaped bent wire part having two edge parts connected by two annular parts and opposed to one another, the spring element can be produced simply by automatic wire bending machines.

The cylindrical spring sleeve or the annular parts of the bent wire part extend spirally and, with their offset edges or edge parts, they cooperate with corresponding groove rolling rings formed on the bolt. The sliding friction occurring in this device can be replaced by rolling friction if necessary. The spring element, which is arranged concentrically with the gear-shift shaft and is radially expandable, is provided with recesses located at one axial end. These recesses cooperate with an axially acting spring-loaded bolt arrangement; therefore, axial and radial positioning is achieved with the fewest number of components.

Because the C-shaped spring sleeve with the recesses arranged at its axial end cooperate with axially resilient tongues on the holding disk secured against rotation, only slight modifications to the original C-shaped spring sleeve and the holding disk are necessary. Cooperation of the bent wire part with a catch pin fixed in the housing produces the angular positioning by resilient displacement of the annular parts in the axial direction.

To allow a transition from sliding friction to rolling friction, the C-shaped spring sleeve is provided at one of its axial ends with an angled flanged face, in which the recesses are constructed. The recesses cooperate with a spring-loaded ball subassembly located in an axial bore formed in a closure member of an enlarged portion of the bearing bore on which the shaft is supported.

Each axial end of the C-shaped spring sleeve includes a flange face in which a recess is formed, both recesses cooperating with the spring-loaded ball located in an axial bore of the housing or in the closure member to convert sliding friction on one side of the spring sleeve, otherwise brought about by an axial pressure component, into rolling friction.

The spring element may also be constructed from plastic molding, in which the spring loaded ball subassembly is located for cooperation with recesses on the closure member.

Due to the configuration of connecting faces located between the recesses and cooperation of the faces with radial and axial spring forces, an axial and radial gear-shift shaft return can be effected as soon as the bolt is removed from a recess. The restoring forces desired for radial return of the gear-shift shaft cannot be developed solely by the spring forces, which act only axially in similar devices in the prior art.

BRIEF DESCRIPTION OF THE DRAWINGS

The invention is described in more detail with reference to the embodiments illustrated in the drawings.

FIG. 8 is a cross section similar to that of FIG. 1 showing a positioning device for locating the shaft axially and angularly.

FIG. 9 is a bottom view of the C-shaped spring sleeve of FIG. 8.

FIG. 10 is an end view taken in direction X—X in FIG. 8.

FIG. 11 is a cross section similar to that of FIG. 1 showing a positioning device able to locate the shaft axially and angularly.

FIG. 12 is a bottom view of a bent wire part shown in FIG. 11.

FIG. 13 is an end view taken in direction XIII—XIII of FIG. 11.

DESCRIPTION OF THE PREFERRED EMBODIMENT

Figure 1:
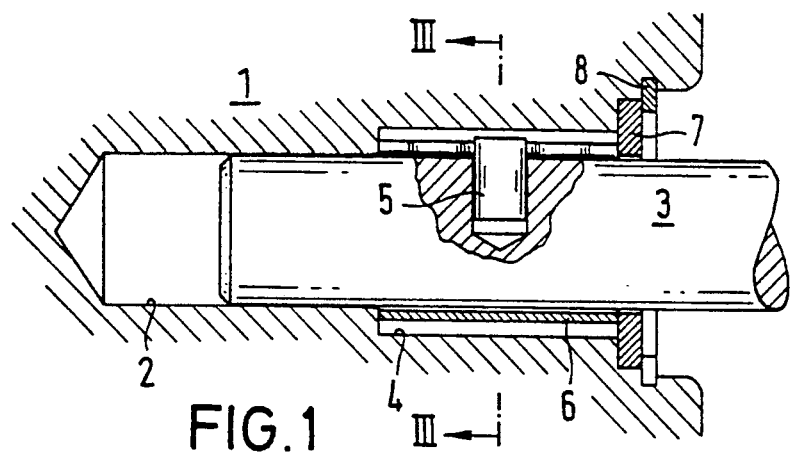
FIG. 1 is a vertical cross section through a transmission housing showing a gear-shift shaft located in a bore and a positioning device according to this invention.

In FIG. 1, a transmission housing is formed with a bore 2, which rotatably and axially slidably supports a gear-shift shaft 3, a component of the gear shift mechanism that selects and engages the gears of the transmission. After the bearing bore 2 is formed, a somewhat larger diameter bore 4 extending only partially along the length of bore 2 is formed. The length of bore must be greater than the length along which shaft 3 moves axially during operation.

The shaft 3 carries a bolt 5 extending radially outward a short distance from the diameter of the shaft and located substantially in the center of the axial length of bore 4, which locations correspond to the neutral plane of the transmission shift mechanism. A radially expandable spring element 6, which surrounds shaft 3 and is fixed axially in the housing by a holding disk 7 and snap ring 8, is located in bore 4.

Figure 2:
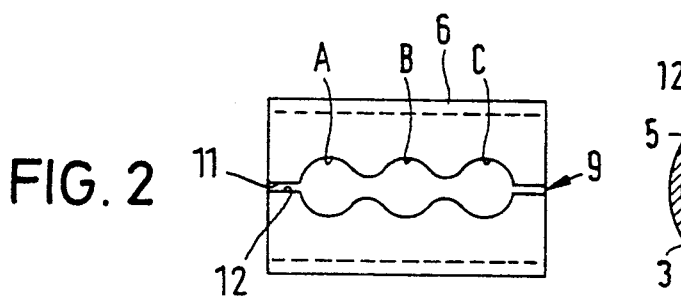
FIG. 2 is a plan view of a spring sleeve shown in FIG. 1.
Figure 3:
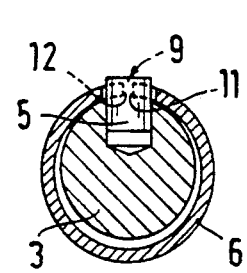
FIG. 3 is a cross section taken at plane III—III in FIG. 1.

In the embodiment shown in FIGS. 1-3, the radially expandable spring element 6 is formed as a cylindrical sleeve of spring steel having an axial longitudinal slot 9 with mutually facing edges 11, 12. Recesses A, B, C are connected mutually by rounded connecting surfaces formed in the mutually facing edges 11, 12 of the spring sleeve. Alternately, the spring sleeve 6 can be made of plastic, molded from a suitable material having high spring stiffness and good sliding properties.

During assembly, holding disk 7 and the spring sleeve 6 are first pushed onto shaft 3 and then bolt 5 is inserted radially into the hole drilled partially through a diameter of the shaft. Shaft 3, which is preassembled in this way, is inserted axially into bore 4 and the C-shaped snap ring 8, which axially fixes the subassembly, is then installed.

If shaft 3 is displaced axially in bore 2, the spring sleeve 6 cannot move axially because it is held by the holding disk 7 and snap ring 8. As a result of axially directed force applied to shaft 3, bolt 5, located in the central depression B of sleeve 6, forces the spring sleeve to expand radially in a resilient manner, thereby allowing the shaft to move to its next predetermined axial shift position.

The magnitude of the force applied to the shaft to overcome resistance of the spring sleeve to movement between depressions A, B and C can be determined by adjusting the shape of the surfaces on the sleeve between the depressions. Depressions A and C determine the axial position of the shaft and limit the range of axial motion of the shaft.

Figure 4:
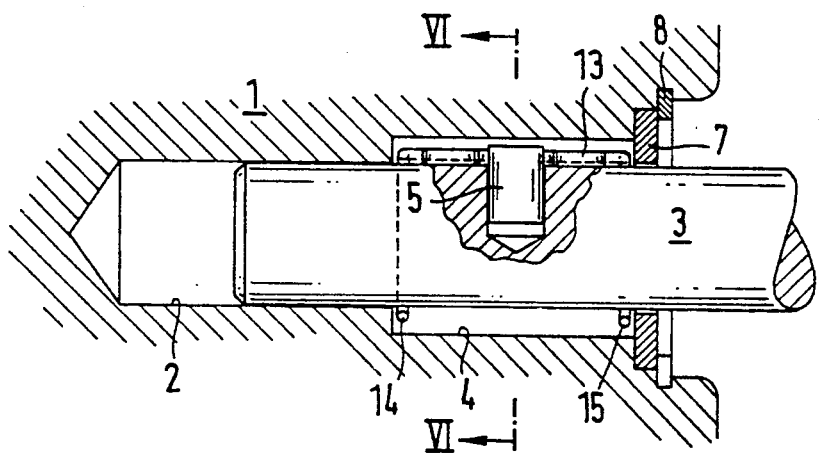
FIG. 4 is a vertical cross section through a transmission housing showing a second embodiment of the positioning device according to this invention.
Figure 5:
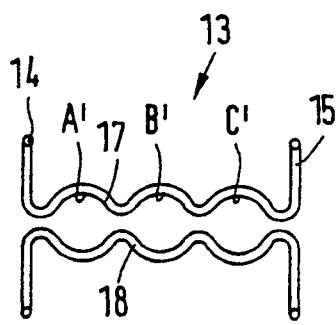
FIG. 5 is a plan view of the bent wire part shown in FIG. 4.
Figure 6:
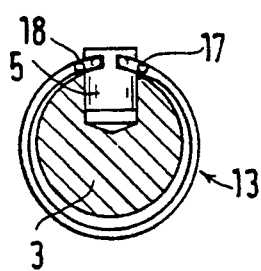
FIG. 6 is a cross section taken at plane VI—VI in FIG. 4.

FIGS. 4-6 shown another embodiment of a positioning device in which the radially expandable spring element is constructed as a bent wire part 13. Member 13 is formed by two annular parts 14, 15, connected by two complimentary, serrated, axially extending connectors, each having a portion of a depression A', B', C'. The bent wire part 13 has a substantially coil-shaped configuration arranged concentrically to the gear shaft and located within bore 4.

The bent wire part is fixed axially in the housing by a holding disk 7 and a C-shaped snap ring 8. The mode of operation of the second embodiment is the same as described with reference to FIGS. 1-3.

Figure 7:
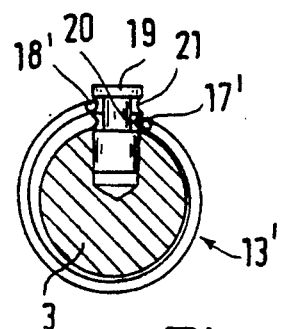
FIG. 7 is a cross section, similar to FIG. 6, of another embodiment of the bent wire part used with grooved rolling rings.

If the sliding friction that occurs between bolt 5 and the C-shaped spring sleeve 6 or the bent wire part 13 is too tight and requires too large a force to move the bolt among the depressions, the sleeve or bent wire part may be formed spirally when viewed along the axis of the shaft so that its edges 17', 18', which are mutually offset, are located within the grooves 20, 21 formed on the outer surface of the catch bolt 19. The grooves are spaced along the axis of bolt 19 a short distance corresponding to the offset distance by which ends 17' and 18' are spaced. A configuration corresponding to this description is illustrated in FIG. 7.

The positioning devices described with reference to FIGS. 1-7 are intended for use with the gear shift mechanism of a manually operated transmission, but the positioning device can be used in an equally desirable manner to fix the axial gear-shift positions on the manual selector lever of an automatic transmission. Due to its sleeve shape, the positioning device is particularly desirable for an arrangement connected directly to the manual valve of an automatic transmission.

Because the positioning device of this invention, either in the form of the spring sleeve or bent wire part, is fixed within the bore only in the axial direction, it can follow rotary movements of the shaft and the most varied shift movements of a manual selector lever. More than three axial positioning depressions can be provided on the device.

Another embodiment of the positioning device according to this invention is described with reference to FIGS. 8-10, the same reference numerals being used for identical components and, for slightly modified components, the same reference numerals modified by an apostrophe.

FIG. 8 shows a C-shaped spring sleeve 6' having at one of its axial ends additional recesses D, E and F, which are engageable by an axially movable, spring-loaded bolt, formed simply by a modified holding disk 7'.

A resilient tongue or projection 23 having a head 24 engaging recesses D, E and F is formed on holding disk 7', whose face is cut through its thickness by an arcuate slot 22. Holding disk 7' is fixed against rotation in housing 1 by a screw 25, which passes through a hole in the disk and engages screw threads tapped in the housing. Holding disk 7' is restrained against axial movement by a C-shaped snap ring 8, fitted within a recess in the housing and the periphery of the snap ring. If the gear-shift shaft is axially moved, operation is the same as that described above.

During rotation of the gear-shift shaft 3, the projection head 5 engages the C-shaped spring sleeve 6' and can move readily between recesses D, E and F by resiliently deflecting spring tongue 23. In this way, when the projection head 24 becomes seated in one of the recesses D, E, F, the radial position of shaft 3 is held releasably. Due to the form of the surfaces that connect recesses D, E, and F, the magnitude of a predetermined force required to rotate shaft 3 between detent locations D, E, F can be accurately established by determining the spring constant of projection 24 and the axial distance between the bottom of the detent recess and the apex of the surface between the recesses.

FIGS. 11-13 show another embodiment of the positioning device having the capacity to position the shaft both radially and axially. The radial positioning of the shaft is established by forming on one annular part 15' recesses D', E' and F' at a location remote from the edge parts 17' and 18'. Annular part 15' provides an axial spring force when deflected axially due to contact by the radially projecting pin 26 as it becomes seated and unseated in the recesses D', E and F'. Holding disk 7" is annular and has a radially directed slot that provides ready access for pin 26 to contact the recesses on annular part 15'. Snap ring 8 secures the assembly against axial movement out of the bore formed in the housing in which the assembly is located.

Figure 14:
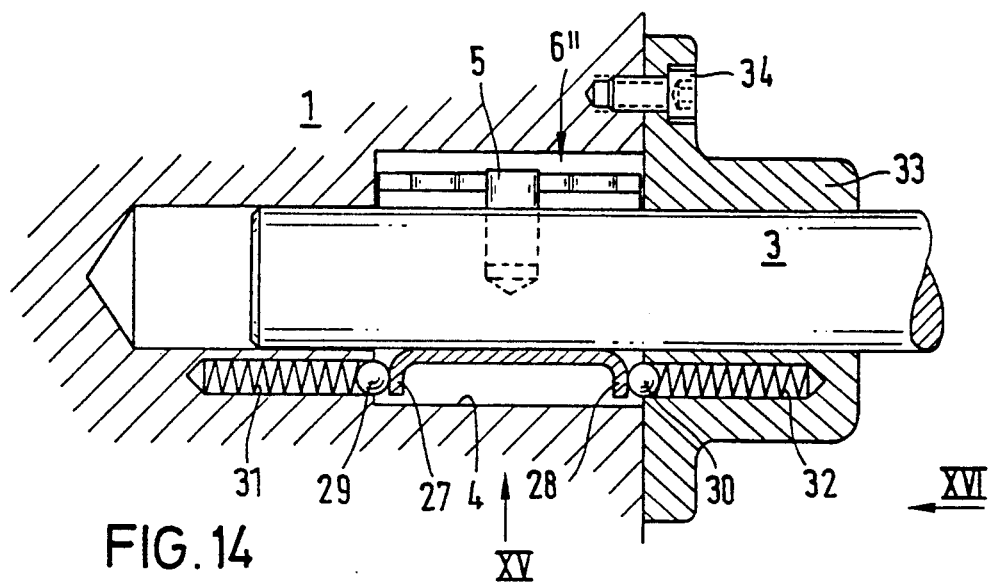
FIG. 14 is a cross section similar to that of FIG. 1 showing another embodiment of a positioning device for locating the shaft axially and radially.
Figure 15:
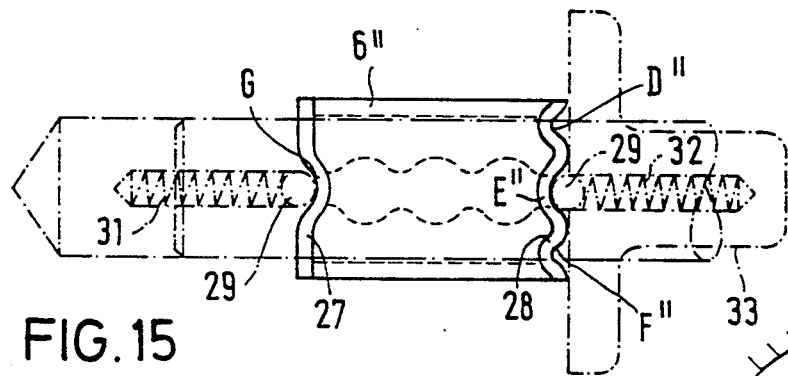
FIG. 15 is a bottom view of the C-shaped spring sleeve of FIG. 14.
Figure 16:
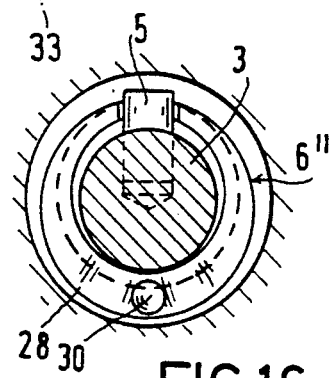
FIG. 16 is an end view taken in the direction XVI—XVI of FIG. 14 with the closure member removed.

FIGS. 14-16 show another embodiment of the positioning device according to the invention. A C-shaped spring sleeve 6" is provided at its two axial ends in the region remote from a longitudinal or axial slot with outwardly angled flanges 27, 28, on which recesses D", E" and F" are constructed. These recesses are adapted to receive balls 29, 30, urged axially toward a position of engagement with recesses D', E' and F' by springs 31, 32. Spring sleeve 6" is restrained axially by a closure member 33, which is fixed in a suitable manner on the housing by screws 34 that engage screw threads tapped in the housing.

A centrally located recess G formed on flange face 27 allows return of the shaft 3.

Locating the balls and springs in axial bore in the housing or in closure member 33 is illustrated merely by way of example. The balls can be supported by spring washers or by other suitable spring-loaded devices.

Figure 17:
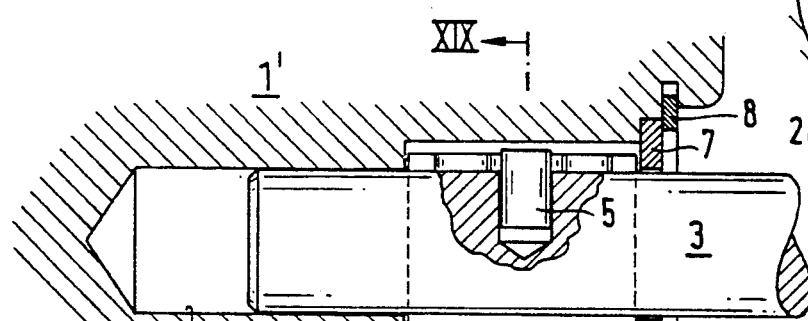
FIG. 17 is a cross section similar to that of FIG. 1 showing another embodiment of the invention.
Figure 18:
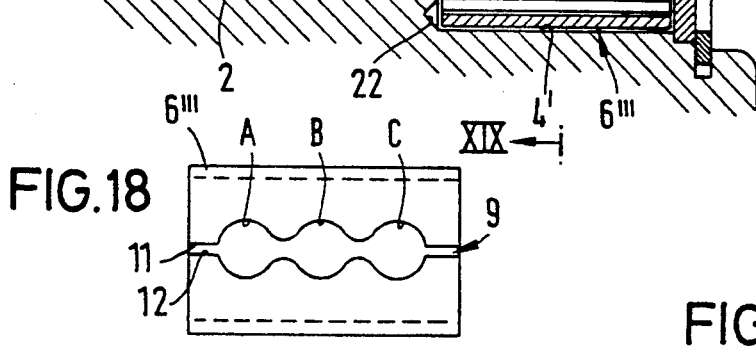
FIG. 18 is a plan view of the C-shaped spring sleeve of FIG. 17.
Figure 19:
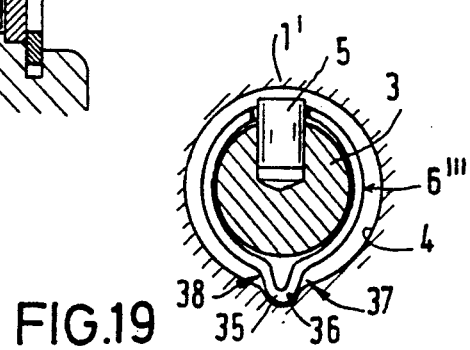
FIG. 19 is a cross section taken at plane XIX—XIX in FIG. 17.

FIGS. 17-19 show another embodiment of the positioning device in which the components previously discussed are located with only the C-shaped spring sleeve 6''' modified. In those figures, spring sleeve 6'''' is provided on its side remote from longitudinal slot 9 with a semicircular fold 35, secured against rotation in a semicircular groove 36 formed in housing 1.

Operation of the positioning means in a neutral gearshift plane of the shift-shaft 3 is unchanged from the description of the embodiments above.

When preselecting gear-shift plane for the first and second gear ratio or for the fifth and reverse gear, spring sleeve 6''' must expand radially on one side by about 15°, the pivoting range of the gear shift-shaft during gear-shift plane preselection. The spring sleeve exerts on the shaft 3 a force, which invariably urges shaft 3 back into the neutral gear-shift plane. This one-sided expansion is possible in the enlarged region 4' of the bearing bore 2.

Frictional contact in the recesses A, B and C of the axial positioning device of FIGS. 17-19 is increased by this axial force because both edges 11, 12 of the spring sleeve 6''' rest on, or slide along the bolt 5 in the neutral gear-shift plane, but only one edge 11 or 12 of the C-shaped spring sleeves 6''' rests on, or slides along the radial bolt 5 in the other two gear-shift planes. The same force for the axial positioning means can be achieved in all three gear-shift Planes with an appropriate design.

Due to the formation of the transitional rounded regions 37, 38 on the semicircular bolt 35, the spring sleeve eventually rests on the edges of groove 36. Therefore, it is possible to obtain different radial restoring forces from the gear shift plane of the first and second gear or fifth and reverse gear.

Groove 36, in the region of bore 2, is formed in a known manner by introducing a first small bore in the housing and then increasing the diameter of the bore to the size of bore 4.

Having described the preferred embodiment of our invention, what we claim and desire to secure by U.S. Letters Patent is:

1. A device for releasably holding a shaft in predetermined positions, comprising:
a shaft supported for displacement along its axis;
a protuberance fixed to the shaft and extending radially from the surface of shaft;
a spring element surrounding a portion of the length of the shaft, having a system of interconnected, mutually-spaced, axially-distributed recesses separated by constructed passages, the protuberance being located in the recess system, the spring element being expandable due to forced contact with the protuberance to open the constricted passages and to permit movement of the protuberance between recesses against resistance of the spring element, and contractable when the protuberance is located in a recess to close the constricted passages thereby restoring potential resistance to movement of the protuberance from said recess, and having a surface projecting radially outward therefrom, located angularly opposite the recess system, adapted to fit within a depression located adjacent said projecting surface, thereby preventing rotation of the spring element relative to the shaft.

2. The device of claim 1 wherein the spring element is a cylindrical sleeve surrounding the shaft having a slot extending along its length. The recesses and constricted passages forming said slot.

3. The device of claim 1 wherein the annular axial members of the spring element spirally encircle the shaft, each annular member having radially offset, angularly spaced ends from which the axial members extend toward the opposite annular end, and the protuberance further comprises recesses mutually spaced along the protuberance, each recess aligned with and adapted to receive an axial member therein.

4. A device for releasably holding a shaft in predetermined positions, comprising:

a shaft supported for displacement along its axis;

a protuberance fixed to the shaft and extending radially from the surface of shaft;

a spring element surrounding a portion of the length of the shaft, having a system of interconnected, mutually-spaced, axially-distributed recesses separated by constricted passages, the protuberance being located in the recess system, the spring element being expandable due to forced contact with the protuberance to open the constricted passages and to permit movement of the protuberance between recesses against resistance of the spring element, and contractable when the protuberance is located in a recess to close the constricted passages thereby restoring potential resistance to movement of the protuberance from said recess, wherein the spring element is of bent wire comprising:

annular members encircling the shaft, located at opposite axial ends of the spring element;

first and second mutually spaced axial members extending axially between the annular members, each axial member having a portion of recesses and surfaces connecting the recess portions facing and mutually aligned axially with the recess portions and connecting surfaces of the other axial member, forming recesses and constricted passages in which the protuberance is located.

5. The device of claim 4 wherein the annular axial members of the spring element spirally encircle the shaft. each annular member having radially offset, angularly spaced ends from which the axial members extend toward the opposite annular end, and the protuberance further comprises recesses mutually spaced along the protuberance, each recess aligned with and adapted to receive an axial member therein.

6. A device for releasably holding a shaft in predetermined angular and radial positions, comprising:

a shaft supported for displacement along its axis and rotation about its axis;

a first protuberance fixed to the shaft and extending radially from the surface of shaft;

a spring element surrounding a portion of the length of the shaft, comprising a first system of interconnected, mutually-spaced, axially-distributed recesses separated by constricted passages, the first protuberance being located in the first recess system, the spring element being expandable due to forced contact with the protuberance to open the constricted passages and to permit movement of the protuberance between recesses against resistance of the spring element, and contractable when the first protuberance is located in a recess to close the constricted passages thereby restoring potential resistance to movement of the first protuberance from said recess;

second recesses located at an axial end of the spring element, said second recesses spaced mutually angularly about the axis of the shaft; and a second protuberance fixed against rotation relative to the shaft, having a displaceable element releasably engaged with said second recesses and resiliently resisting disengagement therefrom.

7. The device of claim 6 wherein the second protuberance includes holding disc means fixed against rotation relative to the shaft, having a transverse surface formed with a slot that defines the displaceable element on said surface, for preventing axial movement of the spring element relative to the shaft.

8. The device of claim 6 wherein the spring element is of bent wire comprising:

a first annular member encircling the shaft, located at an axial end of the spring element;

a second annular member encircling the shaft, located at an axial end opposite the location of the first annular member, having the second recesses formed therein;

first and second mutually spaced axial members extending axially between the first and second annular members, each axial member having a portion of the recesses and surfaces connecting the recess portions of the first system, facing and mutually aligned axially with the recess portions and connecting surfaces of the other axial member, forming first recesses and constricted passages in which the first protuberance is located;

the device further comprising a pin fixed in position and located for engagement with the second recesses.

9. A device for releasably holding a shaft in predetermined angular and radial Positions, comprising:

a shaft supported for displacement along its axis and rotation about its axis;

a protuberance fixed to the shaft and extending radially from the surface of shaft;

a spring element surrounding a portion of the length of the shaft, comprising a first system of interconnected, mutually-spaced, axially-distributed recesses separated by constricted passages, the protuberance being located in the first recess system, the spring element being expandable due to forced contact with the protuberance to open the constricted passages and to permit movement of the protuberance between recesses against resistance of the spring element, and contractable when the protuberance is located in a recess to close the constricted passages thereby restoring potential resistance to movement of the protuberance from said recess;

a flange directed radially from the axis of the shaft, located at one axial end of the spring element, having second recess formed therein, said second recesses spaced mutually angularly about the axis of the shaft;

a first spring; and a first ball located adjacent the second recesses, urged by the spring into engagement with the second recesses, supported for movement toward the second recesses, held against angular movement relative to the second recesses.

10. The device of claim 9 wherein the spring element further comprises:

a second flange located at the axial end of the spring element opposite the first flange, having a central recess substantially aligned angularly with the center of the second recesses;

a second spring; and a second ball located adjacent the second recesses, urged by the second spring in opposition to the force of the first spring into engagement with the central recess, supported for movement toward the central recess, held against angular movement relative to the central recess.

* * * * *